June 16, 1925.
K. G. RUNBACK
AIR FILTER
Filed March 17, 1924
1,542,529
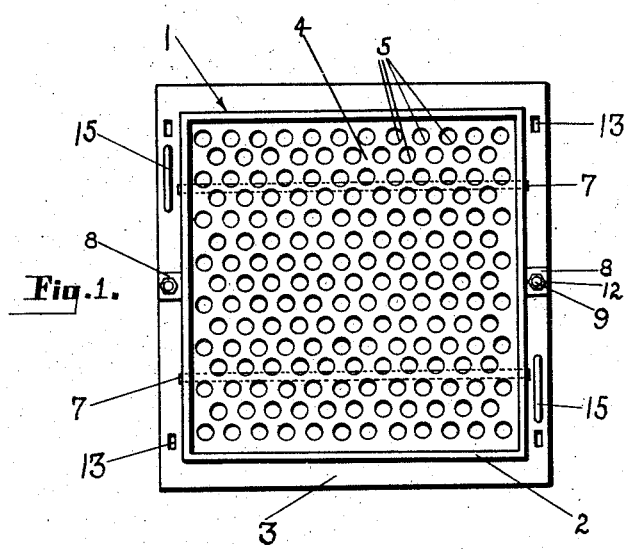
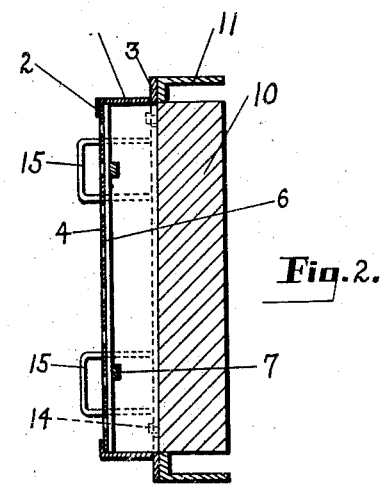
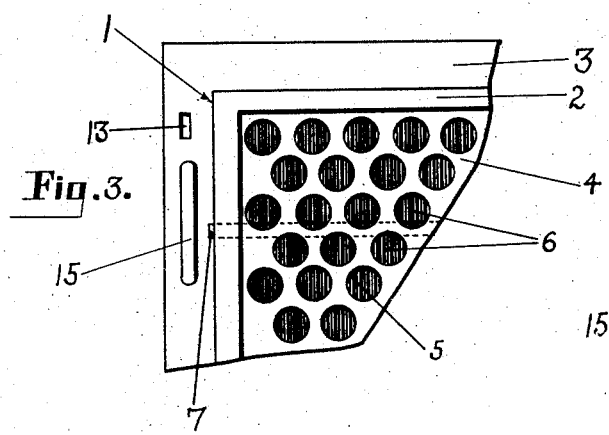
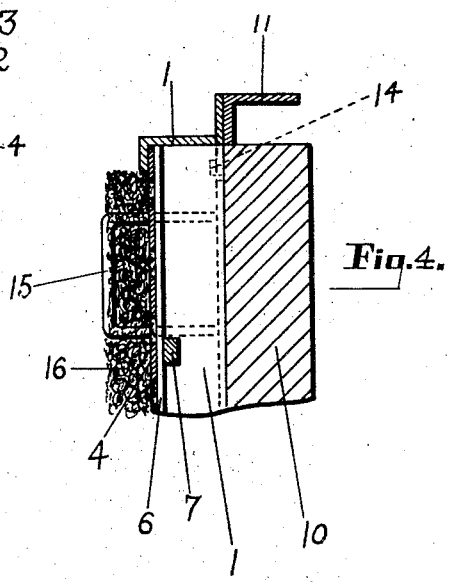
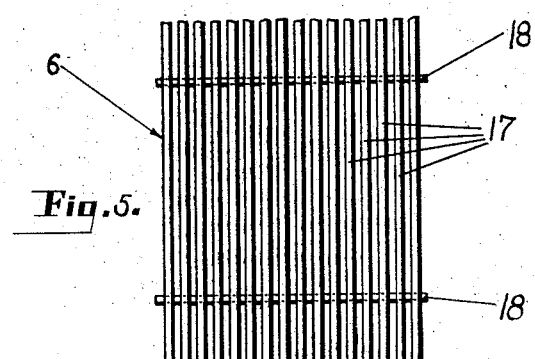
Inventor
Karl G. Runback
By Emil Bønnelycke
Attorney Patented June 16, 1925.

1,542,529

UNITED STATES PATENT OFFICE.

KARL G. RUNBACK, OF NEW YORK, N. Y.; HILMA SOFIA RUNBÄCK, EXECUTRIX OF THE SAID KARL G. RUNBÄCK, DECEASED, ASSIGNOR TO MIDWEST AIR FILTERS, INC., OF NEW YORK, N. Y., A CORPORATION OF NEW YORK.

AIR FILTER.

Application filed March 17, 1924. Serial No. 699,870.

*To all whom it may concern:*

Be it known that I, KARL G. RUNBACK, a subject of the King of Sweden, residing at New York, in the county and State of New York, have invented certain new and useful Improvements in Air Filters, of which the following is a specification.

The present invention relates to a filter for removing solid particles such as lint, fibres, down and other similar particles from air or other gases and is principally characterized by a filter medium consisting of one or more screens of a special design having the members in one direction spaced closer together than the members in the other direction. A further object is to provide a perforated plate in front of and against the screen on the surface of which the lint accumulates and from which it can be easily and effectively removed. A still further object is to provide another filter section which will remove the very finest particles from the air which have passed through the perforated plate and screen and it is, of course, the object of this invention that the perforated plate, screen or screens and filter section are so constructed and arranged that they form a single unitary structure at the same time allowing any one or two of the various elements to function separately or together if desired.

Other objects will be apparent from the following specification taken in connection with the accompanying drawing which shows one embodiment of the entire unitary structure. In the several figures of the drawing the same reference characters denote corresponding parts throughout and,—

Figure 1 is a front view showing the perforated plate mounted in the frame.

Fig. 2 is a sectional view of the entire filter unit.

Fig. 3 is an enlarged detail of the front of the filter with the screen and plate attached.

Fig. 4 is an enlarged detail in section of the filter showing the accumulated lint, and Fig. 5 is a detail of the screen construction.

Referring to the drawing, 1 indicates the frame having a flange 2 and a base portion 3. Against the flange 2 and fitting in said frame 1, a perforated plate 4 is provided having perforations 5 therein of any suitable size. A screen 6 having vertical members 17 spaced close together relative to the horizontal members 18 is adapted to be placed against the perforated plate and both are secured in place by means of rods 7 which fit into suitable holes in the frame 1 and act as springs to keep the plate and screen together. The sets of members of the screen can, of course, be arranged in any suitable manner but they must be arranged so that the members in one direction are arranged closer together than the members in the other direction. Furthermore, the members may be constructed by any suitable known method such as soldering the members 18 to the members 17.

The frame is provided with two lugs 8 each having a hole therein which fits on a stud 9 of the frame of another filter unit. This unit consists of a filter cell 10 arranged in a frame 11. Hexagonal nuts 12 or other suitable means serve to hold the frame 1 containing the perforated plate and screen tightly against the cell 10. Holes 13 in frame 1 are adapted to receive hooks 14 connected to the frame 11 and thus the frame can be supported by hooks 14 on a suitable frame 11 when this frame 1 and its plate and screen are used without the filter cell 10. The frame 1 is also provided with any suitable number of handles 15 by means of which the frame 1 can be handled as a single unit or if secured to frame 11 and cell 10 by means of studs 9 this entire compound unit can be easily handled as a unitary structure. Fig. 1 shows the usual arrangement of a handle at two opposite corners but if a very large unit is constructed a handle at each corner is essential for easy and ready handling.

Fig. 4 shows how the lint 16 which has been separated from the air, accumulates on the surface of the perforated plate. The lint thus forms a loose blanket, which offers a very low resistance to the air passing through it and will retain some of the fine particles which otherwise would pass through the screen or plurality of screens. The object of the attached filter cell 10 is to remove all particles which have passed through the lint blanket and the screens, thus acting as a finishing filter although the perforated plate and the screen can be used separately as a unit if desired. The use of a perforated plate makes it possible to obtain a filter from which the lint can be very easily removed and this can be done when a substantial blanket of lint has formed by simply rolling it rapidly off from the perfectly smooth face of the plate and the lint that has been wedged between the screen members will follow at the same time, since the edges of the perforations on the plate prevent the lint from extending to any great depth beyond the plate.

The screen alone without the perforated plate forms a very good filter from which the lint can be readily removed since the long spaces between members 17 formed by the widely spaced members 18 eliminate to a great extent the many places where the lint can become wedged as is the case of a screen which has an almost square mesh. Thus the lint blanket can be easily removed as it follows the long members 17 and will pull itself free of members 18 due to the long spaces. The unitary structure and the general arrangement permits the use of the screen independent of the plate on the filter 10 but the use of one or all of these various elements depends upon the conditions under which the filter is used.

I claim as my invention:—

1. A filter comprising a frame; a perforated plate in said frame; a screen in said frame adjacent said plate and consisting of two sets of members, the members of one set being directly connected to and spaced closer together than the members of the other set; and a pair of spring rods secured at each end in said frame and adapted to force the screen against said plate and secure them in said frame.

2. A filter unit comprising a frame; a perforated plate in said frame; a screen in said frame and adjacent said plate, said screen consisting of two sets of members, the members of one set being directly connected to and spaced closer together than the members of the other set; a pair of spring rods secured at each end in said frame and adapted to force said plate and screen together and secure them in said frame; a second frame, said frames being adapted to be secured together; and a filter cell in said second frame for receiving such small particles which pass through the screen and plate.

3. A filter unit comprising a frame having a flange and a base portion; a perforated plate in said frame; a screen in said frame and adjacent said plate, said screen consisting of two sets of members, the members of one set being directly connected to and spaced closer together than the members of the other set; a pair of spring rods secured at each end in said frames and adapted to force said plate and screen against said flange and secure them in said frame; a second frame, said frames being adapted to be secured together by means of the base portion of the first-named frame; and a filter cell in said second frame for receiving such small particles which pass through the plate and screen.

In testimony whereof I affix my signature.

KARL G. RUNBACK.